United States Patent
Hentschel et al.

(10) Patent No.: US 10,544,874 B2
(45) Date of Patent: Jan. 28, 2020

(54) COIL CAPTURE APPARATUS AND PILOT OPERATED WATER VALVE INCORPORATING SAME

(75) Inventors: Mark A. Hentschel, Elburn, IL (US); Jerome C. Klopp, Arlington Heights, IL (US); Jesse Wardeh, Arlington Heights, IL (US)

(73) Assignee: Robertshaw Controls Company, Itasca, IL (US)

( * ) Notice: Subject to any disclaimer, the term of this patent is extended or adjusted under 35 U.S.C. 154(b) by 2510 days.

(21) Appl. No.: 12/984,330

(22) Filed: Jan. 4, 2011

(65) Prior Publication Data

US 2012/0168657 A1 Jul. 5, 2012

(51) Int. Cl.
| | | |
|---|---|---|
| *F16K 27/12* | (2006.01) | |
| *F16K 31/06* | (2006.01) | |
| *F16K 27/02* | (2006.01) | |
| *F16K 27/08* | (2006.01) | |
| *F16K 27/10* | (2006.01) | |
| *F16K 27/04* | (2006.01) | |

(52) U.S. Cl.
CPC .............. *F16K 31/06* (2013.01); *F16K 27/029* (2013.01); *F16K 27/048* (2013.01); *F16K 27/08* (2013.01); *F16K 27/10* (2013.01); *F16K 27/102* (2013.01); *F16K 27/12* (2013.01); *Y10T 29/53* (2015.01)

(58) Field of Classification Search
CPC .......... H01F 7/128; H01F 7/1653; H01F 3/00; H01F 41/02; F16K 27/029; F16K 27/048; F16K 27/08; F16K 27/10; F16K 27/102; F16K 27/12; F16K 35/06; F16K 31/60; F16K 27/0281; Y10T 137/0486; Y10T 137/6011; Y10T 137/5987; Y10T 137/5196; Y10T 137/5109; Y10T 137/6014; Y10T 137/6024; Y10T 137/6017; Y10T 137/6021
USPC .................... 251/129.15, 291; 335/278, 281; 137/270, 315.03, 315.11–315.15
See application file for complete search history.

(56) References Cited

U.S. PATENT DOCUMENTS

| | | | | |
|---|---|---|---|---|
| 3,639,870 A | * | 2/1972 | Benson ................ | H01F 7/1623 335/257 |
| 4,298,020 A | | 11/1981 | Inada et al. | |
| | | | (Continued) | |

FOREIGN PATENT DOCUMENTS

DE    10 2005 049 123 A1    10/2006

OTHER PUBLICATIONS

U.S. Appl. No. 15/972,594, filed Dec. 20, 2010, Tam Nguyen.
(Continued)

*Primary Examiner* — Matthew W Jellett
(74) *Attorney, Agent, or Firm* — Reinhart Boerner Van Deuren P.C.

(57) ABSTRACT

Attachment mechanisms for capturing solenoid coil assemblies onto valves and valves incorporating same are described. Such mechanisms include weld rings attached to the valve body that have locking tabs to engage and hold the solenoid coil assembly. Two or more locking tabs are used. Inclusion of locking tab receiving locations on the solenoid coil frame or configuration of the end surface of the solenoid frame itself accommodate the locking tabs. The weld ring may be attached in an infinite number of orientations on the valve body. Attachment may be by spin welding or ultrasonic welding of the weld ring to the valve body in two embodiments.

20 Claims, 3 Drawing Sheets

(56) References Cited

U.S. PATENT DOCUMENTS

| | | | |
|---|---|---|---|
| 4,387,878 A * | 6/1983 | Zukausky | 251/30.03 |
| 4,418,886 A | 12/1983 | Holzer | |
| 4,443,775 A * | 4/1984 | Fujitani | H01F 7/1607 |
| | | | 335/251 |
| 4,483,672 A | 11/1984 | Wallace et al. | |
| 4,502,661 A | 3/1985 | Swanson | |
| 4,534,537 A | 8/1985 | Zukausky | |
| 4,884,782 A * | 12/1989 | Hensley | F16K 31/06 |
| | | | 251/129.15 |
| 4,981,155 A | 1/1991 | Pick et al. | |
| 5,145,145 A | 9/1992 | Pick et al. | |
| 5,181,692 A | 1/1993 | Brausfeld | |
| 5,363,873 A | 11/1994 | Richmond | |
| 5,808,534 A * | 9/1998 | Laffey | H01F 7/081 |
| | | | 335/250 |
| 5,941,502 A * | 8/1999 | Cooper | F16K 27/0281 |
| | | | 251/129.15 |
| 5,954,311 A | 9/1999 | Thorpe | |
| 6,076,550 A * | 6/2000 | Hiraishi | F16K 31/0655 |
| | | | 137/550 |
| 6,119,966 A * | 9/2000 | Wagner | F02M 47/027 |
| | | | 239/585.1 |
| 6,170,516 B1 | 1/2001 | Sakata et al. | |
| 6,269,834 B1 * | 8/2001 | Huhnen | F15B 13/0817 |
| | | | 137/269 |
| 6,374,814 B1 | 4/2002 | Cook et al. | |
| 6,684,901 B1 * | 2/2004 | Cahill | F16K 31/0655 |
| | | | 137/15.18 |
| 6,820,651 B2 * | 11/2004 | Seuret et al. | 137/625.65 |
| 8,267,375 B1 * | 9/2012 | LaHousse | F16K 27/003 |
| | | | 251/129.15 |
| 9,228,669 B2 * | 1/2016 | Iwata | F16K 27/00 |
| 9,249,895 B2 * | 2/2016 | Hettinger | F16K 27/003 |
| 2009/0224191 A1 * | 9/2009 | Nam | F16L 37/23 |
| | | | 251/129.15 |
| 2009/0256093 A1 * | 10/2009 | Chen | F16K 31/0675 |
| | | | 251/129.15 |
| 2010/0019179 A1 * | 1/2010 | Nguyen | 251/129.15 |

OTHER PUBLICATIONS

Solenoids and Actuators, paper, Mar. 3, 2018, 15 pages, V2.01, homepages.which.net/~paul.hills/Solenoids/SolenoidsBody.html - 26k - .

* cited by examiner

COIL CAPTURE APPARATUS AND PILOT OPERATED WATER VALVE INCORPORATING SAME

FIELD OF THE INVENTION

This invention generally relates to solenoid operated valves, and more particularly to apparatuses for connecting a solenoid coil assembly on a pilot operated water valve.

BACKGROUND OF THE INVENTION

Valves are used in many applications wherein the control of the flow of a process fluid is needed. Such process fluids may include liquids such as oil, fuel, water, etc., or gases such as, e.g., natural gas, oxygen, etc. Some valves operate to meter the flow of fluid therethrough and operate by accurately positioning the valving member to control the amount of fluid allowed to pass through the valve. Other valves operate in a switching fashion wherein the flow of fluid therethrough is either turned on or turned off. Such valves may be utilized, for example, in consumer and commercial appliances such as washing machines, etc., whereby water is allowed to flow for a predetermined period of time or until a predetermined volume has been dispensed therethrough. The control of the operation of such valves is typically performed by an electronic control circuit, such as a micro processor-based controller, along with its associated drive circuitry, to open and/or close the valving member within the valve.

A problem with such switching valves is the force necessary to open the valving member against the static pressure of the process fluid acting on one side of the valving member. Depending on the application, this pressure may be quite high, particularly when compared with the low pressure on the opposite side of the valving member which, in many appliance applications, is at atmospheric pressure. In addition to the static fluid pressure acting on the valving member tending to keep it closed, many such switching valves also include a spring positioned to apply a force on the valving member. This spring force allows the valve to be closed upon the removal of a drive signal, and maintains a bias force on the valving member to keep it closed.

In such configurations, the valve actuator must overcome both the static fluid pressure, which can be quite high and may vary from installation to installation, as well as the spring force, both of which are acting to keep the valve closed. Once these two forces have been overcome, however, the force necessary to continue to open the valve to its fully open position is substantially reduced as the pressure differential across the valving member face drops dramatically. Once this pressure has been equalized, the only remaining force against which the actuator must act is the spring force.

Many electronically controlled switching valves include an electrically actuated solenoid to directly act on a plunger connected to the valving member to move the valving member to its open position. Unfortunately, due to the high pressure differentials that exist for a closed valve and the spring force, the actuator needs to be relatively large so that it is able to reliably operate the valve under all operating conditions and installations. In many industries, such as the consumer appliance industry, strict Governmental and certifying agency requirements place a heavy premium on an electric power usage. As such, these direct acting solenoid controlled valves that include solenoids sized to reliably open the valving member provide a significant disadvantage to the appliance manufacturer in being able to attain agency certification as, for example, as an Energy Star appliance rated appliance. Further, the appliance industry is highly competitive and the cost of such large solenoid actuators also provides a significant detriment to their use.

To overcome these problems many manufacturers have gone to a pilot valve design that allows for a significantly reduced size solenoid actuator to be used to operate the valve. Specifically, a pilot operated valve utilizes a relatively small solenoid to be used to move a plunger to open a small pilot valve having a small pilot opening in the valving section. When opened, this pilot valve allows a small amount of water to flow and open a diaphragm using the principle of differential pressure and surface area. The diaphragm then opens the main valving member that controls the main flow of the process fluid. In other words, pilot operated valves take advantage of the energy of the process fluid pressure to do most of the work to open and close the valve.

Since the solenoid now need only open the small pilot valve, its size may be substantially reduced. This small size results in a lower energy usage as well as lower costs, both providing a significant advantage in many industries, such as the consumer appliance industry. As a result, appliance manufacturers, such as the assignee of the instant application, provide literally millions of pilot operated water valves each year.

Typical small solenoids include a solenoid coil of approximately 7055 turns of 38 AWG (American wire gauge) gauge copper wire wound on a bobbin, which uses approximately 28 grams of copper. The coil and bobbin are then over molded within encapsulation. The solenoid also includes a ferromagnetic pole frame having an air gap in the magnetic path thereof. The ferromagnetic pole frame is constructed from a pair of brackets.

While the typical pilot operated water valves provide a substantial reduction in the solenoid actuator size, and therefore cost, over direct acting solenoid actuated valves, the solenoids still rely on copper wire windings to generate the magnetic force needed to operate the pilot valve actuator. Unfortunately, the cost of copper has increased more than three hundred percent in recent years. This significant price increase has significantly increased the cost of the solenoid actuator coil to a point where the solenoid coil now provides a significant cost of the valve as a whole (about fifty percent). Unfortunately, in such a competitive industry, the difference of only a few cents can make or break a major sale. With the forecast showing continuing increases in the cost of copper as well as other raw materials used to construct the solenoid actuators, there existed a need in the art for a new solenoid coil design that reduces the material costs by reducing the amount of copper used to form the solenoid coil. Countering this copper reduction effort, however, is the requirement for reliable operation at each actuation and continued long life of such valves.

These conflicting requirement lead to the development of a new solenoid design for a pilot operated water valve having reduced material costs that still provides reliable actuation and long operational life. Such a solenoid is described in co-pending application Ser. No. 12/178,977, entitled Solenoid For A Pilot Operated Water Valve Having Reduced Copper And Increased Thermal Efficiency, filed on Jun. 24, 2008, and assigned to the assignee of the instant application, the teachings and disclosure of which are incorporated in their entireties herein by reference thereto. Such a solenoid includes a magnetic pole frame that is positioned around the coil of 40 AWG copper wire with a height to width ratio of substantially less than one.

While such a solenoid provides significant advantages over prior solenoid operated pilot valves, the short-fat configuration of the coil assembly introduces difficulties in securing the coil assembly to the water valve itself. Prior castle-top configurations integrated into the solenoid guide tube have proven not to be viable due to height restrictions in the overall design. As such, an attachment mechanism that can secure the coil assembly of a solenoid to the pilot operated water valve is needed.

Embodiments of the invention provide such a coil capture apparatus and method of mounting a coil to a water valve. These and other advantages of the invention, as well as additional inventive features, will be apparent from the description of the invention provided herein.

BRIEF SUMMARY OF THE INVENTION

In view of the above, embodiments of the present invention provide new and improved solenoid coil capture mechanisms that overcome one or more problems existing in the art. More specifically, embodiments of the present invention provide new and improved solenoid coil capture mechanisms that utilize a coil capture weld ring attached to the valve body to secure the solenoid coil to the valve body. Still more specifically, embodiments of the present invention provide new and improved pilot operated valves utilizing such solenoid coil capture mechanisms.

In one embodiment, a coil capture weld ring is spin welded to the valve body. In another embodiment the coil capture weld ring is ultrasonically welded to the valve body. Regardless of the attachment method, the weld ring may be oriented on the valve body in an infinite number of orientations as required by a particular installation.

Embodiments of the weld ring include locking tabs that engage the solenoid coil frame. The use of locking tabs allow the solenoid coil assembly to be slid into engagement therewith during assembly of the valve. In one embodiment, the weld ring includes two locking tabs, while other embodiments include more than two locking tabs. Engagement of the locking tabs on the solenoid coil assembly may be accommodated by locking tab receiving locations defined in the coil frame itself, or by configuration of the end surface of the coil frame itself.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
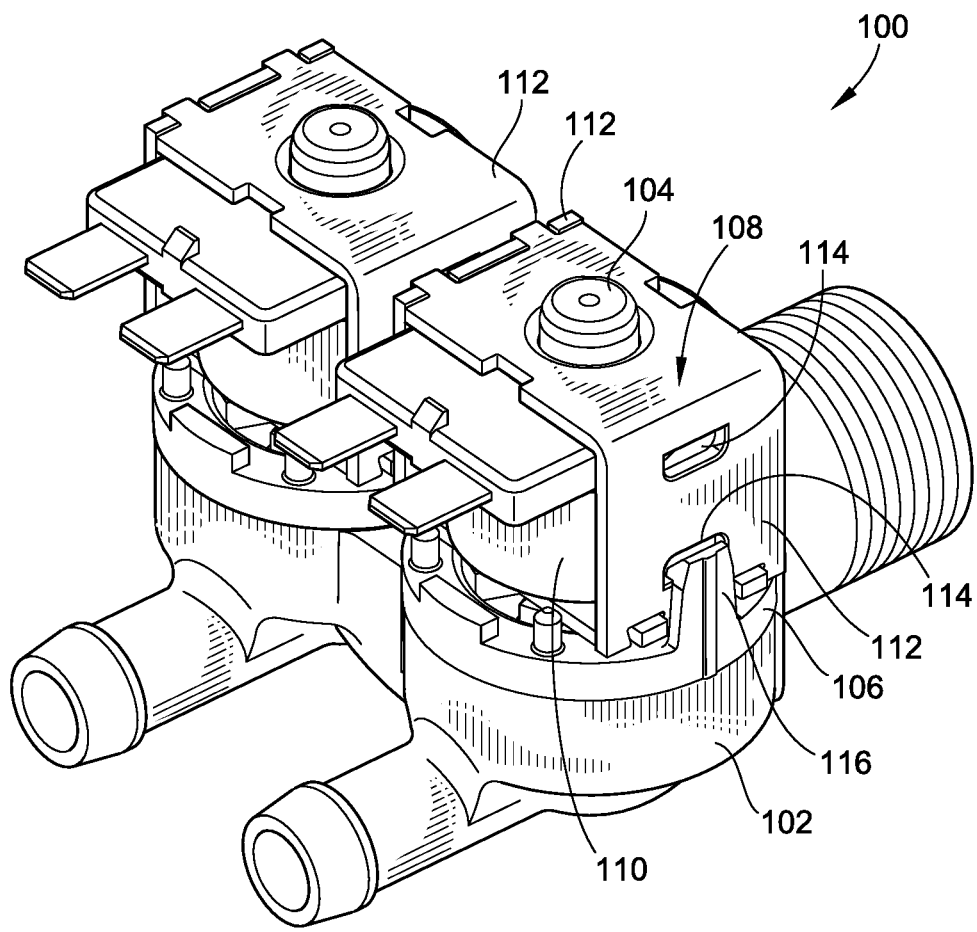
FIG. 1 is an isometric illustration of an embodiment of a pilot operated mixing valve constructed in accordance with the teachings of the present invention.

Turning now to the drawings, and particularly to FIG. 1, there is illustrated an embodiment of a pilot operated water valve 100 constructed in accordance with the teachings of the present invention. It should be noted, however, that while the following description will discuss various embodiments of the present invention in a particular operating environment, to with a pilot operated water valve for a consumer appliance, applications of the teachings of the present invention may find use in other environments, and the exclusive right thereto is reserved in accordance with the claims appended hereto. In other words, the following exemplary embodiments should be taken by way of example and not by way of limitation.

The pilot operated water valve 100 illustrated in FIG. 1 includes a valve body 102, a guide tube assembly 104, a coil capture weld ring 106 and a removable solenoid coil assembly 108. The valve body 102 may take various forms and configurations known in the art, and therefore will not be described herein in detail. For example, such valving configurations may take the form of the V2 Series of pilot operated solenoid valves for use in clothes washers, dish washers, showers, air conditioning systems, and other domestic or commercial applications that is available from the assignee of the instant application. A complete description of the solenoid coil assembly 108 and the operation thereof may be had with reference to the above identified and incorporated co-pending application, and so will not be repeated in detail herein.

Briefly, however, the solenoid coil assembly 108 includes a solenoid coil 110 wound on a bobbin. The coil 110 is then over molded within an encapsulation, which may be plastic, resin, or other appropriate encapsulation material based on the operated environment in which pilot operated solenoid valve is to be installed. The solenoid coil assembly 108 also includes a ferromagnetic pole frame constructed in one embodiment from a pair of identical L brackets 112. While such identicality provides significant manufacturing and parts stocking advantages, other embodiments do not require that the L brackets 112 be identical.

In the embodiment illustrated in FIG. 1 that utilizes identical L brackets 112, each L bracket 112 includes a pair of locking tab receiving locations 114. These locking tab receiving locations 114 are positioned to receive the pair of locking tabs 116 (see FIG. 2) of the weld ring 106 to secure or capture the solenoid coil assembly 108 to the valve body 102. The use of two locking tab receiving locations 114 on identical L brackets 112 also allows installation of the solenoid coil assembly 108 in an inverted orientation. In embodiments that do not utilize identical L brackets, only a single locking tab receiving location on each is needed to receive its respective locking tab 116.

Figure 2:
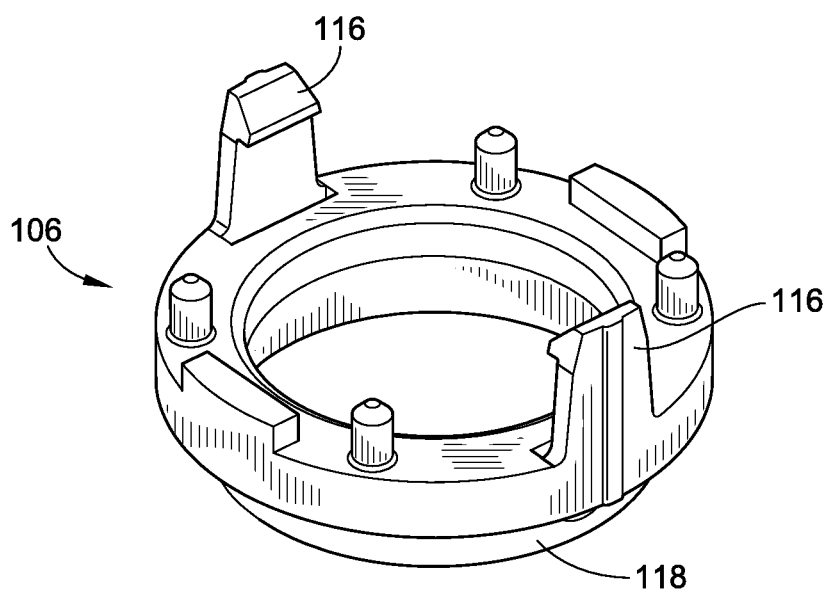
FIG. 2 is an isometric illustration of an embodiment of a coil capture weld ring of the present invention having two locking tabs.

Referring to FIG. 2, the weld ring 106 includes a weld skirt 118 that is joined to the valve body 102 by various methods, including spin welding, ultrasonic welding, etc. Advantageously, the weld ring 106 may be oriented on the valve body 102 in an infinite number or orientations relative to the valve body 102 for mounting the solenoid coil assembly 108. This is due to the circular configuration of the weld skirt 118. Such welding attachment may be accomplished by a servo spin welder or ultrasonic welder with great accuracy. The locking tabs 116 are preferably oriented around the periphery of the weld ring 106 at equal angular displacements therearound. In FIG. 2, the locking tabs 116 are on opposite sides of the body of the weld ring 106 and they extend in a common orientation, i.e. upward as seen in FIG. 2, to engage the solenoid coil assembly 108 (see FIG. 1).

Once the weld ring 106 has been affixed in the desired orientation to the valve body 102, the solenoid coil assembly 108 is attached by pressing it into place over the guide tube 104 until the locking tabs 116 are fully engaged in the locking tab receiving locations 114. This eliminates the need for a separate piece part to attach the solenoid coil assembly 108 and allows for removal of the solenoid coil assembly 108 for rework operations if necessary in manufacturing. This method also provides positive coil retention with higher retention forces than existing processes.

Figure 3:
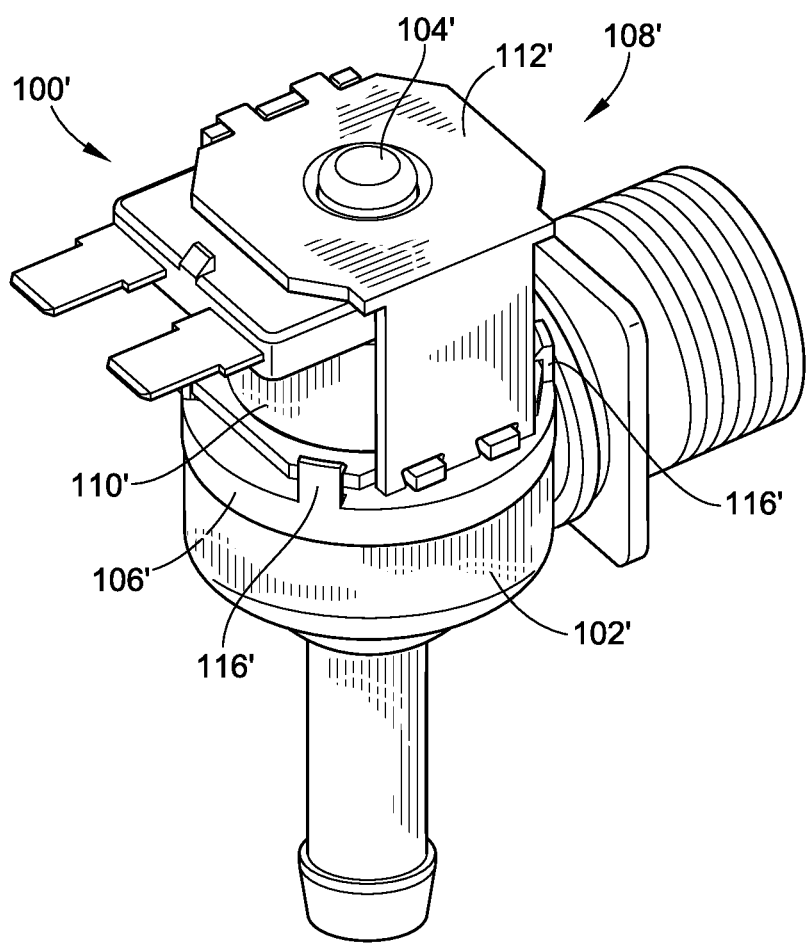
FIG. 3 is an isometric illustration of an embodiment of a pilot operated water valve constructed in accordance with the teachings of the present invention.
Figure 4:
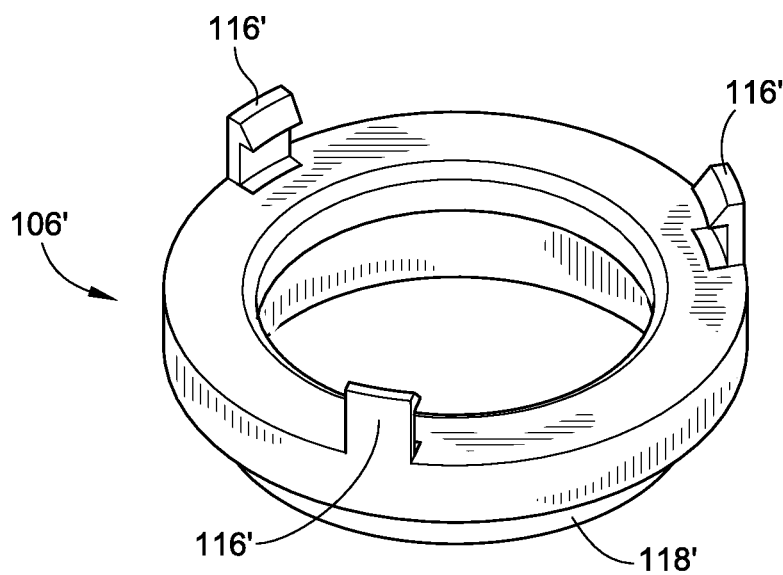
FIG. 4 is an isometric illustration of an embodiment of a coil capture weld ring of the present invention having three locking tabs

FIG. 3 illustrates an alternate embodiment of a pilot operated water valve 100' utilizing a three locking tab 116' embodiment of a weld ring 106', the details of which are illustrated in FIG. 4. As may be seen from these illustrations, the L brackets 112' do not include a locking tab receiving location. Instead, each of the locking tabs 116' engages an edge of the end surface of the L bracket 112' forming the bottom of the solenoid coil assembly 108'.

Figure 5:
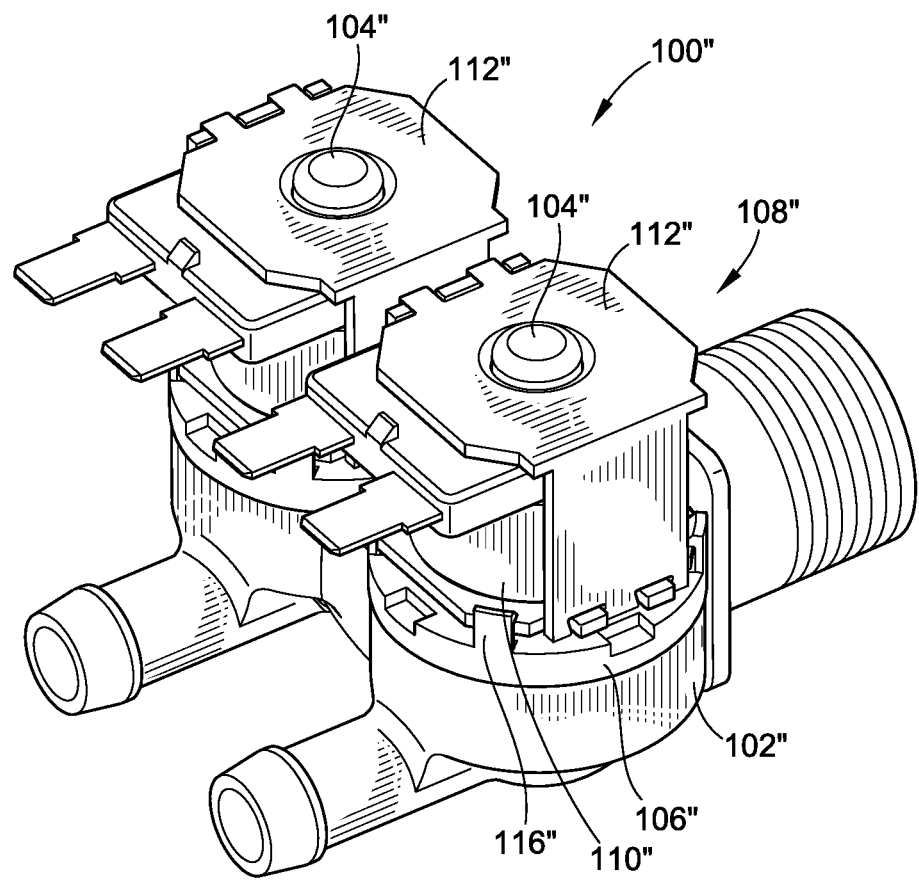
FIG. 5 is an isometric illustration of an embodiment of a pilot operated mixing valve constructed in accordance with the teachings of the present invention.
Figure 6:
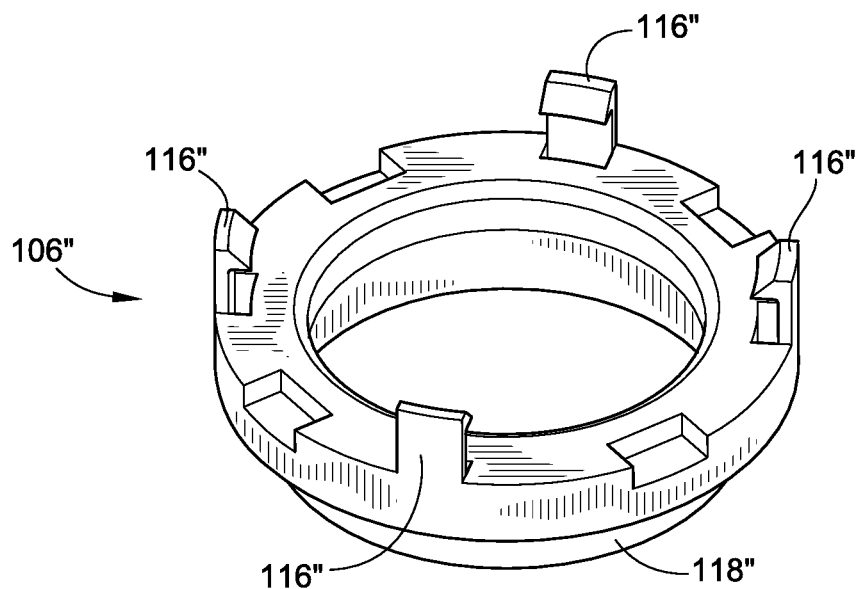
FIG. 6 is an isometric illustration of an embodiment of a coil capture weld ring of the present invention having four locking tabs.

FIG. 5 illustrates an alternate embodiment of a pilot operated water valve 100" utilizing a four locking tab 116" embodiment of a weld ring 106", the details of which are illustrated in FIG. 6. As may be seen from these illustrations, the L brackets 112" do not include a locking tab receiving location. Instead, each of the locking tabs 116" engages an edge of the end surface of the L bracket 112" forming the bottom of the solenoid coil assembly 108".

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A coil capture weld ring to attach a solenoid coil assembly to a valve body, comprising:
   a body defining a plurality of locking tabs configured for locking engagement with the solenoid coil assembly;
   a weld skirt extending from the body and configured for attachment to the valve body.

2. The coil capture weld ring of claim 1, wherein the plurality of locking tabs includes two locking tabs.

3. The coil capture weld ring of claim 2, wherein the two locking tabs are positioned on opposite sides of the body and extend in a common orientation to engage the coil assembly.

4. The coil capture weld ring of claim 1, wherein the plurality of locking tabs includes three locking tabs.

5. The coil capture weld ring of claim 4, wherein the three locking tabs are positioned equidistant from one another around a periphery of the body and extend in a common orientation to engage the coil assembly.

6. The coil capture weld ring of claim 1, wherein the plurality of locking tabs includes four locking tabs.

7. The coil capture weld ring of claim 6, wherein the four locking tabs are positioned equidistant from one another around a periphery of the body and extend in a common orientation to engage the coil assembly.

8. The coil capture weld ring of claim 1, wherein the weld skirt is configured to allow the coil capture weld ring to be positioned in an infinite number of orientations on the valve body.

9. The coil capture weld ring of claim 8, wherein the weld skirt is circular.

10. The coil capture weld ring of claim 1, wherein the body is circular.

11. The coil capture weld ring of claim 10, wherein the plurality of locking tabs are positioned at equal angular displacements around the body.

12. A pilot operated valve, comprising:
    a valve body;
    a solenoid coil assembly; and
    a coil capture weld ring affixed to the valve body to attach the solenoid coil assembly thereto, the coil capture weld ring including a body defining a plurality of locking tabs configured for locking engagement with the solenoid coil assembly, and a weld skirt extending from the body and configured for attachment to the valve body.

13. The pilot operated valve of claim 12, wherein the valve body includes a guide tube, and wherein the solenoid coil assembly surrounds the guide tube when attached to the coil capture weld ring.

14. The pilot operated valve of claim 12, wherein the solenoid coil assembly includes a coil and a frame, and wherein the frame includes a plurality of locking tab receiving locations configured to accommodate the locking tabs of the coil capture assembly.

15. The pilot operated valve of claim 14, wherein the frame is formed from two identical L brackets, and wherein each L bracket includes two locking tab receiving locations.

16. The pilot operated valve of claim 15, wherein the two locking tab receiving locations are configured to allow the solenoid coil assembly to be affixed to the valve body in a first and a second orientation, wherein the second orientation is inverted from the first orientation.

17. The pilot operated valve of claim 12, wherein the solenoid coil assembly includes a coil and a frame, and wherein the frame includes a first end surface having edges configured to engage the locking tabs to enable the solenoid coil assembly to be affixed to the valve body in a first orientation.

18. The pilot operated valve of claim 17, wherein the frame includes a second end surface having edges configured to engage the locking tabs to enable the solenoid coil assembly to be affixed to the valve body in a second orientation, wherein the second orientation is inverted from the first orientation.

19. The pilot operated valve of claim 12, wherein the weld skirt is circular to enable attachment of the coil capture weld ring to the valve body in one of an infinite number of orientations.

20. The pilot operated valve of claim 19, wherein the weld skirt is one of spin or ultrasonically welded to the valve body.

* * * * *